(12) United States Patent
Pasdar

(10) Patent No.: US 9,197,601 B2
(45) Date of Patent: Nov. 24, 2015

(54) SYSTEM AND METHOD FOR PROVIDING A SINGLE GLOBAL BORDERLESS VIRTUAL PERIMETER THROUGH DISTRIBUTED POINTS OF PRESENCE

(71) Applicant: Bat Blue Networks, Inc., Clifton, NJ (US)

(72) Inventor: Babak Pasdar, Jersey City, NJ (US)

(73) Assignee: Bat Blue Networks, Inc., Clifton, NJ (US)

( * ) Notice: Subject to any disclaimer, the term of this patent is extended or adjusted under 35 U.S.C. 154(b) by 124 days.

(21) Appl. No.: 13/910,609

(22) Filed: Jun. 5, 2013

(65) Prior Publication Data

US 2014/0366079 A1    Dec. 11, 2014

(51) Int. Cl.
*H04L 29/00* (2006.01)
*H04L 29/06* (2006.01)

(52) U.S. Cl.
CPC .................................. *H04L 63/0209* (2013.01)

(58) Field of Classification Search
USPC ................................ 370/252; 707/100; 726/1
See application file for complete search history.

(56) References Cited

U.S. PATENT DOCUMENTS

| 2005/0149609 | A1 | 7/2005 | Lamport |
| 2009/0089300 | A1* | 4/2009 | Vicente .......................... 707/100 |
| 2009/0178132 | A1 | 7/2009 | Hudis et al. |
| 2011/0209196 | A1 | 8/2011 | Kennedy |
| 2013/0329584 | A1* | 12/2013 | Ghose et al. .................. 370/252 |

OTHER PUBLICATIONS

International Search Report mailed Oct. 15, 2014 in corresponding PCT Application No. PCT/US14/40523.

* cited by examiner

*Primary Examiner* — Brandon Hoffman
*Assistant Examiner* — Michael D Anderson
(74) *Attorney, Agent, or Firm* — Garson, Segal, Steinmetz, Fladgate LLP; John R. Lane

(57) ABSTRACT

A system and method for providing a virtual perimeter through distributed points of presence. A network system comprises one or more Perimeter Points of Presence (P/PoP) configured to provide a virtual perimeter. The one or more P/PoPs comprise a network interface component; a plurality of selectable service area systems, each of which comprises one or more selectable service area sub-systems, wherein the selectable service area systems and sub-systems can provide a customized virtual perimeter for an entity. The one or more P/PoPs are configured to receive data; process the data using at least one of the service area systems and sub-systems configured as a data processing policy for the entity; and transmit the processed data as policy compliant data from the one or more P/PoP to an end destination.

21 Claims, 13 Drawing Sheets

200

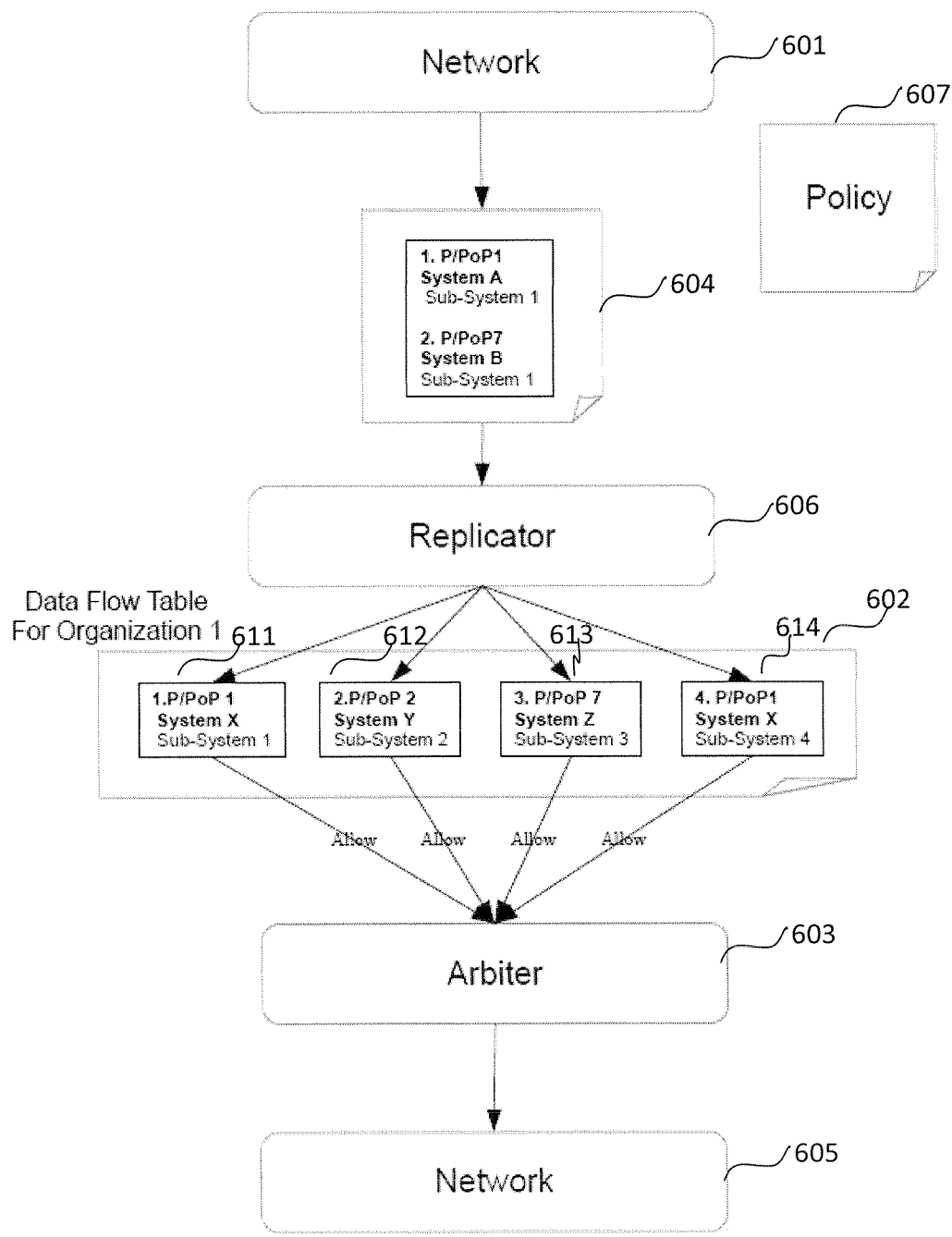

SYSTEM AND METHOD FOR PROVIDING A SINGLE GLOBAL BORDERLESS VIRTUAL PERIMETER THROUGH DISTRIBUTED POINTS OF PRESENCE

FIELD

This invention relates to the field of computer networking and security.

DESCRIPTION OF RELATED ART

As computer platform options have diversified from the data center to public clouds, private clouds and Software-as-a-Service (SaaS) the data that historically resided in data centers only is now distributed throughout different geographic, management, and platform ownership models.

The fence-and-gate approach is used where organizations had complete control over their operating platform and a limited number of controlled, protected, and monitored ingress and egress points. The ingress and egress points, otherwise known as the perimeter, are the points where an organization's control over their computing and communications infrastructure cease to exist. This could be an Internet connection, a third-party connection or even an internal connection where the end-points are not under organizational control such as guest WiFi access.

The distributed nature and the increase in the number of computing options translates into significant increase in the number of perimeter points that have to be controlled, monitored and managed. The current industry standard approach to control, protection, monitoring and management of their distributed computer platforms is to build a perimeter for each computer platform instance. Furthermore, each perimeter typically consists of one or multiple point products to support network, security, and application resiliency and availability elements.

Having to manage multiple disparate perimeters for one or more types of computer platforms is expensive, resource intensive, and difficult. The problem increases as more and more computer platforms and geographically distributed devices are added, until it ultimately becomes an unsustainable model with a reasonable effort.

Whereas the standard approaches to control, manage, and monitor distributed access points today relies on the fence-and-gate approach, these distributed access points could consist of devices and users at an organization headquarters, remote offices, retail stores, remote users and/or devices, home users and/or devices, and mobile users and/or devices.

The fence-and-gate approach used as a standard today to control, protect, monitor, and manage distributed access points and their communications to various computer platforms, the Internet, or other third-party points requires a contained network environment. This approach only works for devices within the contained network. Communications for mobile, remote, and home users and devices that operate outside of contained networks remain uncontrolled and exposed.

Other in-the-cloud options rely on proxy-based technologies that are limited to specific protocols such as http and rely on proxy-aware applications. This represents a limited level of control, protection, and monitoring and thereby does not represent a comprehensive solution.

SUMMARY

The present application discloses a network system comprising one or more Perimeter Points of Presence (P/PoP) configured to provide a virtual perimeter. The one or more Perimeter Points of Presence (P/PoP) comprising: a network interface component configured to accept physical or virtual connections or both; a plurality of selectable service area systems for processing data, each service area system comprising one or more selectable service area sub-systems, wherein the selectable service area systems and selectable service area sub-systems can be configured to provide a customized virtual perimeter for an entity. The one or more Perimeter Points of Presence (P/PoP) are configured to receive data; process the data using at least one of the service area systems and selected service area sub-systems configured as a data processing policy for the entity; and transmit the processed data as policy compliant data from the one or more Perimeter Points of Presence (P/PoP) to an end destination.

Specifically, in an embodiment, each service area is configured to perform at least one of a plurality of actions with respect to the received data.

According to another embodiment, the one or more Perimeter Points of Presence (P/PoP) are configured to process the received data in parallel, serially, or both.

According to another embodiment, the system is configured to perform the parallel processing by at least: replicating the received data across a plurality of the service area systems in parallel; determining at least one of a plurality of actions to be performed on the received data at each of the plurality service areas simultaneously; and sending the determinations to an arbiter component configured to perform one or more of the actions on the received data determined by each service area based on the data processing policy for the entity.

According to another embodiment, the system is configured to: process the received data through plurality service area systems in series; and perform at least one of a plurality of actions on the received data at each of the plurality service area systems.

According to another embodiment, the system is configured to process the same received data in both parallel and in series.

According to another embodiment, data may be communicated to or from an unknown entity, the unknown entity being an entity beyond the organizational control of an entity associated with the customized virtual perimeter. According to another embodiment, the data can be communicated to or from a known entity, the known entity being an entity within the organizational control of an entity associated with the customized virtual perimeter.

According to an embodiment, the received data from an unknown or known source may be communicated through the P/PoP as policy compliant data to one or more known or unknown destinations if deemed compliant with the entity's policies.

According to an embodiment, the received data from an unknown source may be communicated through the P/PoP as policy compliant data to one or more known or unknown destinations or both if deemed compliant with the entity's policies.

According to an embodiment, the received data from a known source may be communicated through the P/PoP as policy compliant data to one or more known or unknown destinations or both if deemed compliant with the entity's policies.

According to an embodiment, the one or more P/PoPs are configured to leverage a physical connection comprised of a dedicated physical connection to connect to one or more P/PoPs to facilitate communications through the P/PoP to other sources and/or destinations.

According to an embodiment, the one or more P/PoPs are configured to leverage a virtual connection comprised of a long-term or temporary virtual connection over private and or public networks to connect to one or more P/PoPs to facilitate communications to and/or through the P/PoP to other sources and/or destinations.

According to an embodiment, the one or more P/PoPs are configured to simultaneously leverage both physical and virtual connections as components of a single connection to one or more P/PoPs to facilitate communications to and/or through the P/PoP to other sources and/or destinations.

According to an embodiment, known sources and/or destinations for an entity may leverage a physical connection comprised of a dedicated physical connection to connect to one or more P/PoPs to facilitate communications to and/or through the P/PoP to other known sources and/or destinations.

According to an embodiment, known sources and/or destinations for an entity may leverage a virtual connection comprised of a long-term or temporary virtual connection over private and or public networks to connect to one or more P/PoPs to facilitate communications to and/or through the P/PoP to other known sources and/or destinations.

According to an embodiment, known sources and/or destinations for an entity may simultaneously leverage both physical and virtual connections as components of a single connection or for the purposes of redundancy, to connect to one or more P/PoPs to facilitate communications to and/or through the P/PoP to other known sources and/or destinations.

According to an embodiment, the associated with the virtual perimeter comprises one or more known entities having organizational control over one or more computing nodes including: a computer platform, a data center, a public cloud instance, a private cloud instance, a hybrid cloud instance, an application-as-a-service platform (AaaS), a software-as-a-service platform (SaaS), a mobile device, a remote user, and an access end-point.

According to embodiment, the selectable service area systems includes at least one service area system selected from one or more service area systems which may be comprised of a network service area system, security service area system, application resiliency and availability service area system, and an application acceleration service area system, and wherein each of the service area systems comprises a plurality of sub-service area systems.

According to another embodiment, the security service area system comprises a plurality of selectable sub-service area systems, the selectable sub-services area systems selected from the group of network port and protocol stateful control, application layer control, deep packet inspection, threat management, malware protection, user and device identification and validation, content filtering, encryption, decryption, and re-encryption.

According to another embodiment, the application resiliency and availability service area system comprises a plurality of selectable sub-service area systems, the selectable sub service area systems selected from the group of availability monitoring, system port monitoring, system application function and availability monitoring, communication distribution between multiple systems, application redirection in the event of unavailability of a critical aspect needed to facilitate the availability of one or more applications.

According to another embodiment, a single policy for an entity associated with a virtual perimeter is distributed to the one or more Perimeter Points of Presence (P/PoP) to support multiple points of ingress and egress via the single policy.

Embodiments also comprise a method implemented by at least one computer comprising a processor, memory, and a computer readable medium storing thereon computer code thereon, wherein the computer is configured to perform at least: accepting network connections at one or more Perimeter Points of Presence (P/PoP) from plurality of entities including at least one entity associated with a customized virtual perimeter; receiving a data flow from a data source at the one or more Perimeter Points of Presence (P/PoP); processing the received data flow at the one or more Perimeter Points of Presence (P/PoP) using a data processing policy for the entity associated with the customized virtual perimeter for the entity; and transmitting the processed data flow as policy compliant data flow from the one or more Perimeter Points of Presence (P/PoP) to an end point, wherein the customized virtual perimeter comprises selectable service area systems for creating the policy.

Embodiments as described herein deliver a distributed in-the-cloud data and flow control mechanism (control) and data flow facilitation mechanism (forwarding) which allows distributed computer platforms such as Data Centers, Public Cloud Instances, Private Cloud Instances, Hybrid Cloud Instances and/or Application/Software-as-a-Service platforms that are geographically and functionally distributed to leverage a single global perimeter policy addressing security, privacy, application resiliency and application availability for inbound and outbound communications through distributed global perimeter points.

Embodiments also provide for a single global perimeter policy via an in-the-cloud control and forwarding mechanism for distributed access methods such as office, remote, home, and mobile users and devices.

According to another embodiment, the received data may from an unknown or known source would be associated with a virtual instance or predefined data flow table that specifies the service, sub-service, and flow path through one or more P/PoPs to one or more known or unknown destinations if deemed compliant with the entity's policies.

BRIEF DESCRIPTION OF DRAWINGS

FIG. 6C illustrates a system in which a combination of Serial and Parallel communication flows are leveraged for data flow processing according to an embodiment of the present disclosure.

DETAILED DESCRIPTION OF EMBODIMENTS

It is to be understood that the figures and descriptions of the present embodiments of the invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

Described are embodiments for system, method, and computer readable medium for providing a single global borderless virtual perimeter through distributed points of presence, utilizing a network system including a computer, a processor, memory, and a computer readable medium storing thereon computer code which when executed by the at least one computer causes the at least one computer to at least: connect one or more Perimeter Points of Presence (P/PoP) geographically distributed with a plurality of computer platforms and a plurality of access end-points.

Figure 1:
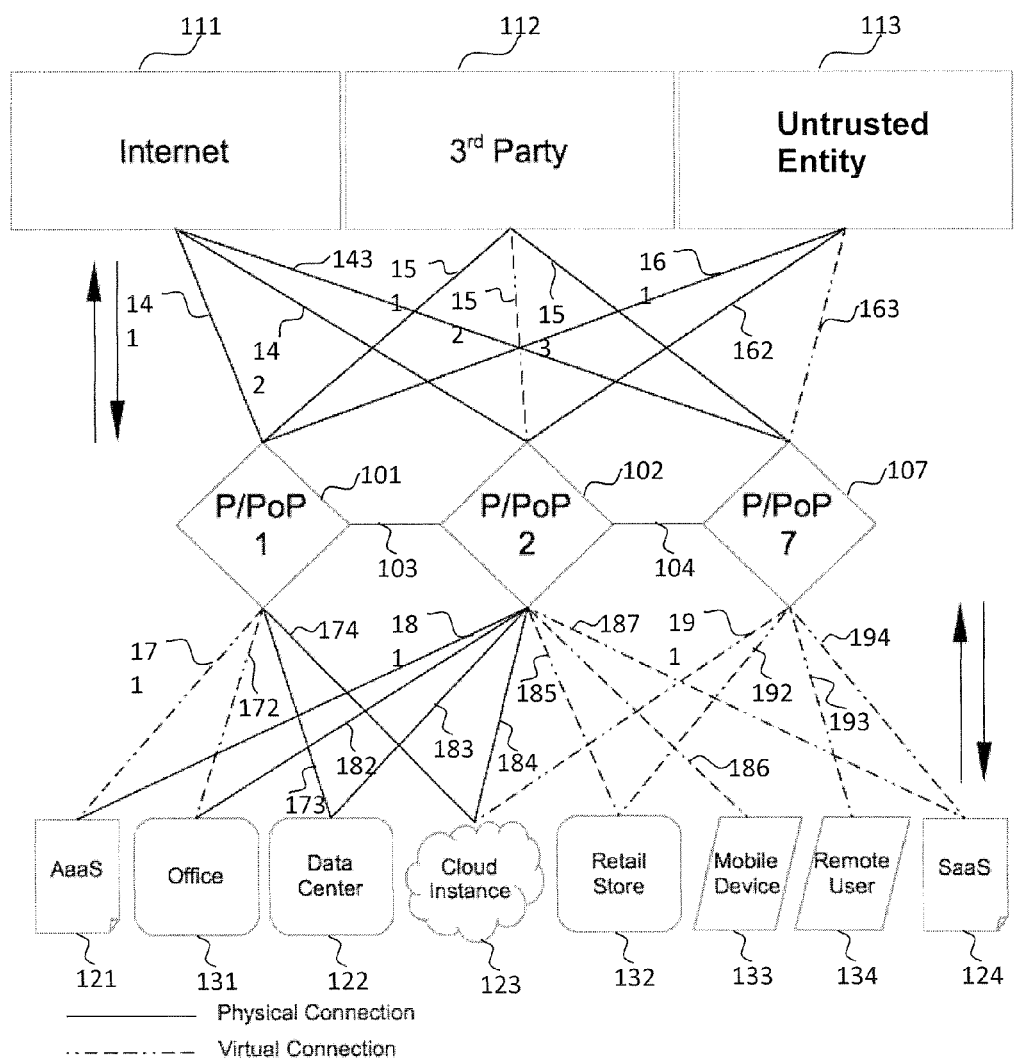
FIG. 1 illustrates a system leveraging a variety of connection types across public and private networks to deliver a virtual perimeter for various computer platforms and access end-points according to an embodiment of the present disclosure.

FIG. 1 illustrates an embodiment of a present system leveraging a variety of connection types across public and private networks to deliver a virtual perimeter for various computer platforms, computing nodes, and access end-points or destination points (collectively "computing nodes," or "nodes"). As shown in FIG. 1, the system comprises one or more Perimeter Points of Presence (P/PoP) that can be geographically distributed, for example, across multiple buildings, cities, regions, countries, and continents. The P/PoP are physically or virtually connected with a plurality of computing nodes for entities associated with a customized virtual perimeter as described herein. Examples of such computing nodes include but are not limited to Application-as-a-Service platforms (AaaS) 121, office 131, data centers 122, cloud instances 123 (including public cloud instances, private cloud instances, hybrid cloud instances), a retail store 132, a mobile device 33, a remote user 134, software-as-a-service platforms (SaaS) 124, and other nodes, some or all of which can be geographically and functionally distributed.

Accordingly, Perimeter Points of Presence 101 are virtually or physically connected with computing nodes for entities associated with a customized virtual perimeter (i.e. known entities) as described herein. For example, AaaS 121 and Office 131, via virtual connections 171 and 172, respectively, and physically connected with Data Center 122 and Cloud Instance 123, via physical connections 173 and 174, respectively. Perimeter Point of Presence 102 is physically connected with AaaS 121, office 131, data center 122 and cloud instance 123, via physical connections 181, 182, 183 and 184, respectively, and virtually connected with retail store 132, mobile device 133, remote user 134 and Saas 124, via virtual connections 185, 186 and 187, respectively. Perimeter Point of Presence 107 is virtually connected with cloud instance 123, retail store 132, remote user 134 and Saas 124, via virtual connections 191, 192, 193 and 194, respectively. As will be appreciated, any of the above-described connections can be virtual or physical, and the connections and computing nodes under the organizational control of entities associated with a customized virtual perimeter (i.e. known entities) are only examples, and are not limited as such.

Access to untrusted or unknown entities, which provide untrusted data flow to users, such as via the Internet, third party and other untrusted entities are physically or virtually, and either directly or indirectly connected with the P/PoP. As used herein, untrusted or unknown refers to entities, platforms, nodes or other data sources or destinations that are beyond the organizational control of an entity associated with a virtual perimeter. For example, as shown in FIG. 1, an untrusted entity such as the Internet 111 is physically connected with Perimeter Points of Presence (P/PoP) 101, 102 and 107, via physical connections 141, 142 and 143, respectively. The entrusted third party 112 is physically connected with Perimeter Points of Presence 101 and 107, via physical connections 151 and 153, respectively, and virtually connected with Perimeter Points of Presence 102, via virtual connection 152. The other untrusted or unknown entity 113 physically connected with Perimeter Points of Presence 101 and 102, via physical connections 161 and 162, respectively, and virtually connected with Perimeter Points of Presence 107, via virtual connection 163.

As described herein, although entities and data entities beyond the control of an organization associated with a virtual perimeter are described as unknown and/or untrusted, the data processing constructed in accord with policies for an known entities such as an entity associated with the virtual perimeter, processes data in both directions (inbound and outbound) with respect to that entity's computing nodes, and can even be configured to process data between the entity's nodes (i.e. akin to a virtual LAN). Unless otherwise indicated, communications inbound represents communications initiated from a known or unknown source to an entity's known destination, and communications outbound represents communications initiated from a known source to an entity's known destination or an another entity's unknown destination. However, as will be appreciated, the systems and subsystems of the one or more P/PoPs can be configured to inbound and outbound data flows in all directions, that is to say, the virtual perimeter of the P/PoP is configured to process inbound data from all entities connected to the one or more P/PoPs as policy compliant outbound data.

Also, although FIG. 1 shows P/PoP(s) configured to process data to and from unknown and known entities, in another embodiment (not shown), the P/PoP(s) can be configured to process data as policy complaint data between unknown entities. For example, an unknown source may connect to one or more P/PoP(s) where one or more services and sub-services may be utilized to process data and transmit the data as policy compliant data to another unknown destination. Factors for processing such communications through the P/PoP(s), a virtual instance and its associated services and sub-services is not limited to identifying nodes or users, but may be based on, for example, application, port, protocol and or other factors.

For example, a user may use his or her own device on a free public wifi network that is connected to or through one or more P/PoP(s) to provide secure Internet web access to any other unknown destination on the Internet. The entity providing the free public wifi may not know the user, the user device or node, nor have control over the user device, and furthermore may not have control over the user's destination. Nonetheless, the unknown user may utilize the unknown device to leverage HTTP protocol over TCP Port 80 to connect to the unknown destination through the one or more P/PoPs. In this embodiment, the P/PoP(s) could be configured to enforce a policy for an entity associated with the virtual perimeter such that unknown users of the free public wifi are only allowed TCP port 80 access using HTTP to restrict access to any non-pornographic, non-malicious Internet destinations. Thus, as will be appreciated, the P/PoP can be configured to process data as policy complaint data to and from unknown entities, i.e., where nodes for both the data source and the destination are unknown with respect to the entity associated with the virtual perimeter.

As shown in FIG. 1, the Perimeter Points of Presence 101, 102 and 107 are interconnected. For example, the Perimeter Points of Presence 101, 102 and 107 may be fully interconnected, i.e, P/PoP 101 is connected to P/PoP 102 via connection 103, P/PoP 102 is connected to P/PoP 107 via connection 104, and P/PoP 107 is connected to P/PoP 101) via connection 105 (not shown in FIG. 1). Alternatively, the Perimeter Points of Presence 101, 102 and 107 may be partially interconnected connected, i.e., P/PoP 101 is connected to P/PoP 102 via connection 103, and P/PoP 102 is connected to P/PoP 107 via connection 104. Alternatively, one or more of the Perimeter Points of Presence (P/PoP) 101, 102 and 107 may operate autonomously without any interconnection.

As will be appreciated, FIG. 1 shows exemplary non-limiting examples of possible physical and virtual connections between known and unknown entities and the Perimeter Points of Presence 101, however connections between any given entity and the Perimeter Points of Presence 101 can be either physical, virtual, or both as the Perimeter Points of Presence 101 are configured to accept all such connections as described herein. For example, an entity may have one or more direct or indirect connections to the P/PoP, including any or all of a dedicated physical connection, a virtual connection, and/or a single path connection where a virtual connection and physical connection are components thereof.

Figure 2A:
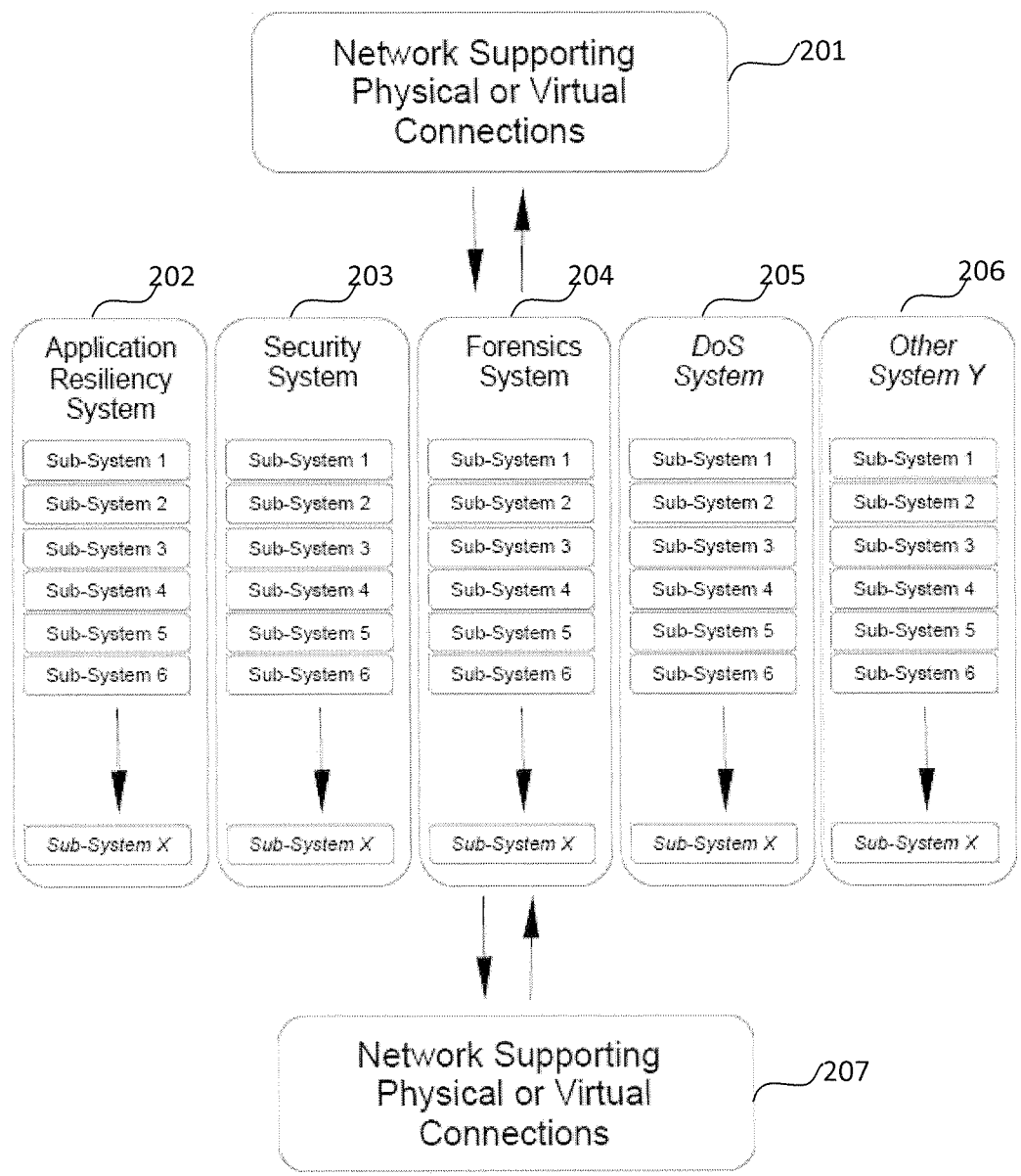
FIG. 2A illustrates a multitude of systems and associated sub-systems utilized in the delivery of virtual perimeter according to an embodiment of the present disclosure.

FIG. 2A illustrates a multitude of systems and associated sub-systems utilized in the delivery of virtual perimeter. As shown in FIG. 2A, the communication flow is transmitted from a known or unknown party via network 201 to one or more Perimeter Points of Presence (P/PoP) that comprise a plurality of systems for processing the data. Examples of systems include systems such as application resiliency system 202, security system 203, forensics system 204, DoS Protection System 205, and system Y 206, etc, which are included in the one or more Perimeter Points of Presence (P/PoP). Then the processed communication flow is sent to network 207 to a destination. As will be appreciated, the systems and subsystems process both inbound and outbound data flows in both directions.

Each of the networks 201 and 207 supports physical or virtual connections. Exemplary network architecture includes Layer 1 (Physical Layer), Layer 2 (Transport Layer), and Layer 3 (Network Layer). As is understood by in the art, packets used in computer network communications contain the originator's source address and the recipient's destination address. Packets are then directed through a variety of devices that make up the network infrastructure. This applies to the Transport Layer (Layer 2) and the Network Layer (Layer 3) through the use of addresses such as MAC and IP addresses or their equivalents. Network infrastructure devices haul these packets throughout the network utilizing various lists to determine how to direct packets to these destinations. These lists can be defined statically or learned from other network infrastructure devices through dynamic means such as routing protocols, (for example, Border Gateway Protocol (BGP)), from other network infrastructure devices that share the devices' known paths to various destinations.

Each of the plurality of systems 202-206 comprises sub-system 1, sub-system 2, sub-system 3 . . . sub-system x, etc. Each P/PoP comprises components in each of the service areas such as network, security, application resiliency and availability, and application acceleration. Each of the service areas may comprise one or more functional technologies. For example the security service area may comprises the following capabilities across shared or distributed subsystems, or each of the following security capabilities may represent a sub-system function:

network port and protocol stateful control;
    application layer control;
    deep packet inspection;
    threat management;
    user and device identification and validation;
    content filtering
    encryption (Site-to-Site encryption, Device to site encryption, Device to Device, Person to Person, etc.)
    decryption
    re-encryption Application resiliency and availability service area may comprise the following capabilities across shared or distributed sub-systems:

System availability monitoring
    System port monitoring
    System application function and availability monitoring
    Communication distribution between multiple systems
    Application redirection in the event of system, port, or application unavailability
    Application load sharing between multiple sites
    Application connection re-use
    Application acceleration Unlike other services in prior art that only support single network protocols, such as http, the system described in the present invention supports every port, protocol, and application regardless of location, geography, type of network, type of access (Layer 1, Layer 2, or Layer 3), means of access, operating system, and application.

According to an embodiment, computing nodes leverage one or more P/PoP(s) as a virtual perimeter by allowing inbound and outbound path for data flow by:

(a) building a connection comprising:
      i. Physical connection—leveraging a physical connection to one or more P/PoP(s).
      ii. Virtual connection—leveraging a site-to-site or device-to-site tunneling technology to connect to one or more P/PoP(s). A virtual connection leverages by encapsulating the communication for traversal across any network such as public, private or community such as SSL (Secure Sockets Layer), IPSec VPN (Internet Protocol Security Virtual Private Network), or GRE (Generic Routing Encapsulation) or similarly functioned technology.
    (b) Utilizing one or more P/PoP(s) as virtual perimeter for an application or system, where the P/PoP(s) acts as a public or private point of access to the application or system. The connection to the P/PoP(s) may or may not be encrypted between the P/PoP(s) and the computing node may or may not be tunneled over a public mediums such as the Internet, third-party connections or other hybrid connections.

According to an embodiment, distributed access endpoints may also leverage one or more P/PoP(s) as a virtual perimeter by allowing inbound and outbound path for data flow by:

(a) Building a connection comprising:
  i. Physical connection—leveraging a physical connection to one or more P/PoP(s).
  ii. Virtual connection—leveraging a site-to-site or device-to-site tunneling technology to connect to one or more P/PoP(s) such as IPSec, SSL VPN, or GRE tunneling.

(b) Utilizing one or more P/PoP(s) as virtual perimeter for an application or system, where the P/PoP(s) acts as a public point of access to the application or system. The connection to the P/PoP(s) may or may not be encrypted and the between the P/PoP(s) and the computing node may or may not be tunneled over a public mediums such as the Internet, third-party connections or other hybrid connections.

All communications inbound and outbound flow through one or more P/PoP(s) where all communications may be subject to one or more functions such as connection, interconnection, control, protection, privacy, application resiliency, DoS protection, monitoring, centralized management and other functions are applied prior to being passed to the destination.

According to an embodiment, the system described in the present invention virtualizes the perimeter into a globally distributed P/PoPs (Perimeter Points of Presence). These P/PoPs normally operate as part of a collective, though may also function autonomously. Each P/PoP supports various elements including:

(a) a network consisting of distributed control and data plane.

(b) virtualized systems and associated functional sub-systems. Though embodiments for network, security, and application resiliency have been specifically described in this document, any perimeter function such as forensics, data leakage prevention, and many other functions can be virtualized and delivered as a service across multiple disparate sites via a single global policy with this model.

(c) specific flows can be defined on a per organization, per end-user, per device and or per application basis among others. These are referred to as a virtual instance. These virtual instances can leverage one or more systems and sub-systems in several ways: serial communication flows, parallel communication flows, and hybrid communication flows.

Figure 2B:
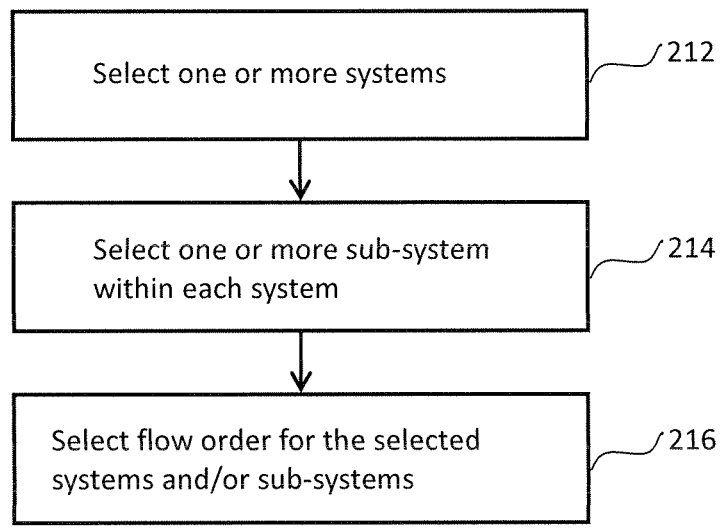
FIG. 2B illustrates a process for defining and selecting a flow process according to an embodiment of the present disclosure.

In another embodiment, FIG. 2B shows a flowchart illustrating a process 200 of configuring a customized data flow process in accord with a data processing policy associated with a customized virtual perimeter. The process 200 starts at block 212, where a user selects one or more desired data processing systems to be implemented at one or more Perimeter Points of Presence (P/PoP). For example, referring back to FIG. 2A, the user may select one or more systems among application resiliency system 202, security system 203, forensics system 204, DoS Protection System 205, and system Y 206, etc.

At block 214, the user may further select one or more desired sub-systems within each of the selected systems. For example, referring back to FIG. 2A, if application resiliency system 202 is selected in block 214, the user may select one or more sub-systems among the sub-systems of the application resiliency system 202, such as sub-system of system availability monitoring; sub-system of system port monitoring; sub-system of system application function and availability monitoring; sub-system of communication distribution between multiple systems; sub-system of application redirection in the event of system, port, or application unavailability; sub-system of application load sharing between multiple sites; sub-system of application connection re-use; and sub-system of application acceleration. If security system 203 is selected in block 214, the user may select one or more sub-system among the sub-systems of the security system 203, such as sub-system of network port and protocol stateful control; sub-system of application layer control; sub-system of deep packet inspection threat management; sub-system of user and device identification and validation; sub-system of content filtering; sub-system of encryption; sub-system of decryption; and sub-system of re-encryption.

In block 216 the user can select the flow order for the selected systems and sub-system, such as serial flow, parallel flow, parallel-to-serial flow, serial-to-parallel flow, or any other combination, which will be described in detail regarding FIGS. 3-6. As will be appreciated, the flow order can be configured as the systems and subsystems are selected. Regardless of the manner of construction, a user can select and customize the systems and subsystems for processing inbound and outbound data, as well as internally communicated data (i.e. akin to a virtual LAN), as well as the treatment of particular types and classes of data, thereby establishing a robust customized virtual perimeter.

Figure 3A:
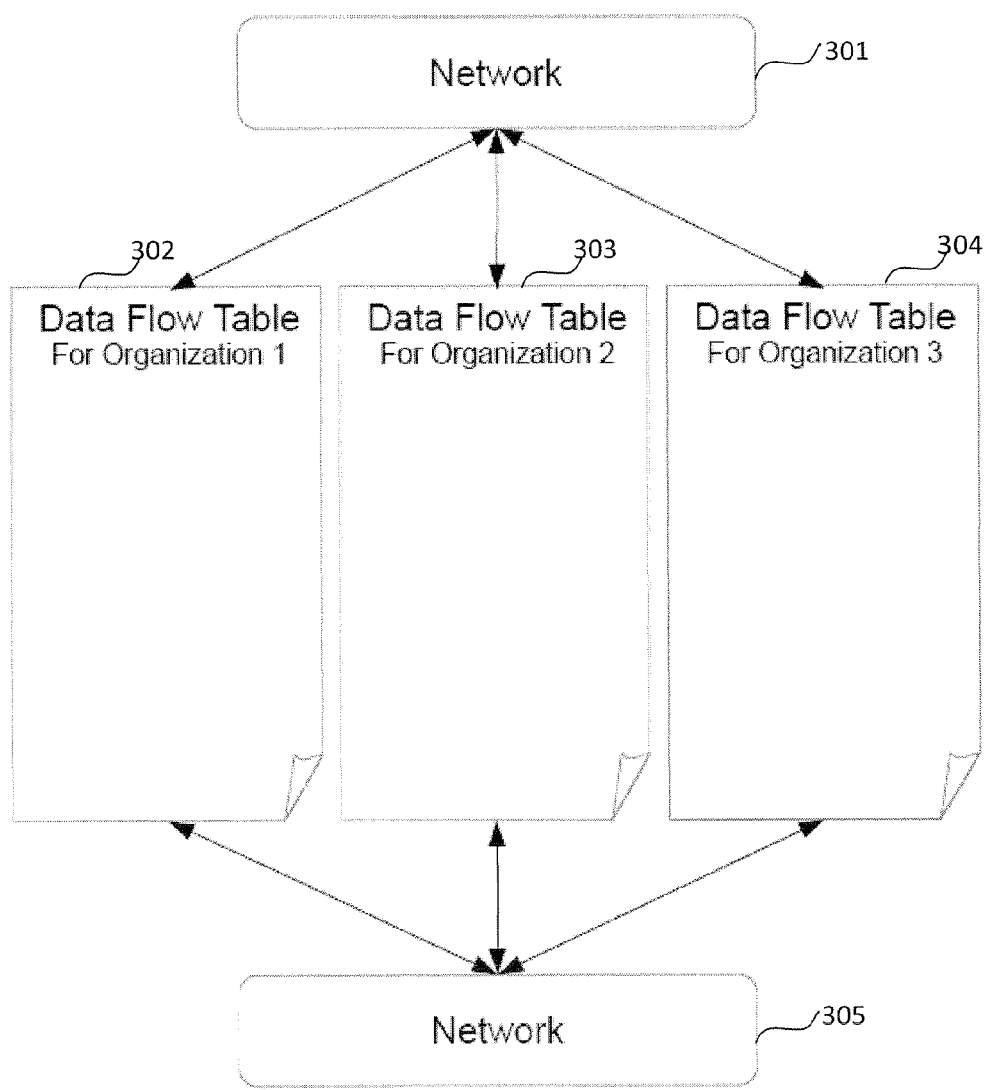
FIG. 3A illustrates multiple virtual instances specifying data flow tables for multiple entities.

According to an embodiment, FIG. 3A illustrates multiple virtual instances specifying predefined data flow tables for multiple entities. As shown in FIG. 3A, the communication flow is transmitted via network 301 to one or more of organizations 1, 2 and 3, and then after being processed in the organization's data flow table 302, 303 and 304, respectively, the communication flow is sent to network 305.

Figure 3B:
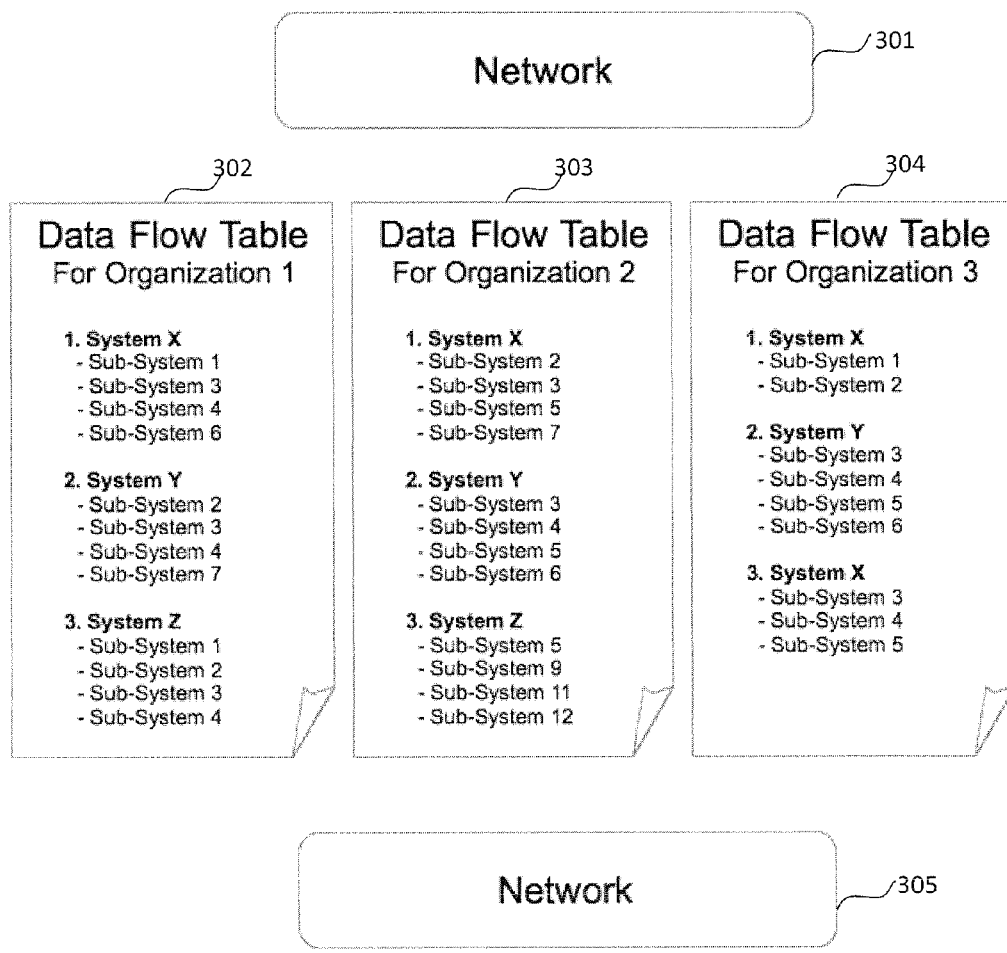
FIG. 3B illustrates a system for processing a serial data flow according to an embodiment of the present disclosure.

According to an embodiment, FIG. 3B illustrates a system for processing a serial data flow according to an embodiment of the present disclosure. In the embodiment, the system is can be configured such that each virtual instance has a specified serial data flow with defined post-processing action. As shown in FIG. 3B, the communication flow is transmitted via network 301 to one or more of organizations 1, 2 and 3, and then after being processed in the organization's data flow table, the communication flow is sent to network 305. For example, a data flow table 302 for organization 1 shows that a data flow may be transmitted in series in a sequence of sub-systems 1, 3, 4 and 6 of system X, sub-systems 2, 3, 4 and 7 of system Y, and then sub-systems 1, 2, 3 and 4 of system Z. For the data flow is processed in data flow table 303 of organization 2, the data flow is transmitted in a sequence of sub-systems 2, 3, 5 and 7 of system X, sub-systems 3, 4, 5 and 6 of system Y, and then sub-systems 5, 9, 11 and 12 of system Z. For a data flow processed in accord with the data flow table 304 of organization 3, the data flow may be transmitted in a sequence of sub-systems 1 and 2 of system X, sub-systems 3, 4, 5 and 6 of system Y, and then sub-systems 3, 4, and 5 of system Z. In these systems and associated sub-systems one or more of various actions may be taken with respect to the data, such as log, alert, drop, reject, allow, redirect, mirror, encrypt, decrypt, and/or next system/sub-system, etc. The communication flow is then processed and if compliant passed on to the network for inbound or outbound delivery to the computer platforms, computing nodes, and/or the end-points depending on the source and/or destination.

Figure 4:
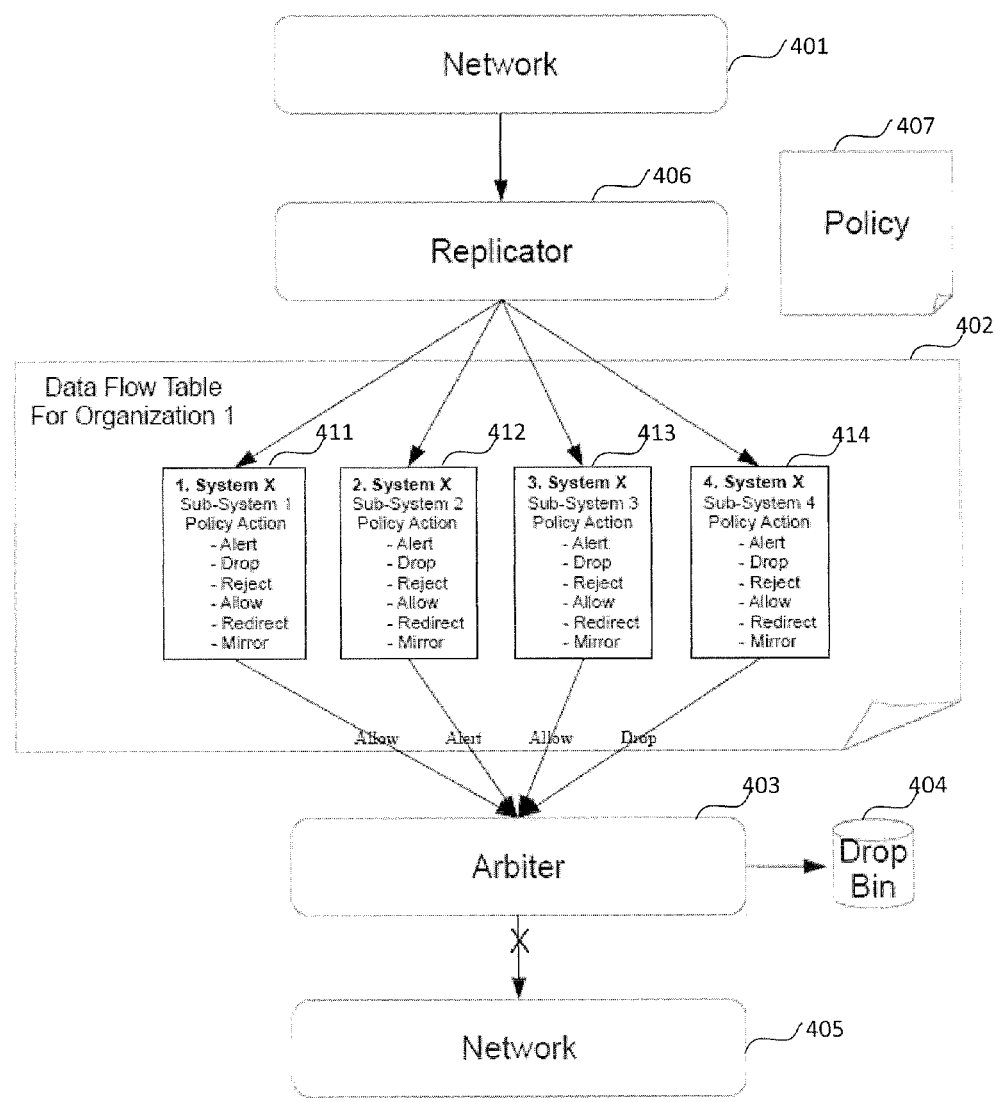
FIG. 4 illustrates a system for processing data flows in parallel according to an embodiment of the present disclosure.

According to an embodiment, FIG. 4 illustrates a system in which data flows may be leveraged in parallel to simultaneously or substantially simultaneously perform multiple processing functions at one or more P/PoP sites, resulting in actions at one or more P/PoP sites, including discarding the flow. As shown in FIG. 4, the communication flow is transmitted via network 401 to the data flow table 402 in accord with a policy 407 for organization 1 where a replicator 406 replicates and simultaneously or substantially simultaneously sends the flow to multiple systems/sub-systems 411-414, which are sub-systems 1-4 of system X, respectively. In these systems/sub-systems one or more of functions take place that may result in one or more actions that may include alert, drop, reject, allow, redirect, mirror, and/or next system/sub-system, etc. As shown in FIG. 4, the actions determined by each of sub-systems 1-3 of system X for the replicated data flow is "allow," and the action for the same data flow a processed by sub-system 4 of system X is "drop." Then these actions from each of the systems/sub-systems 411-414 are sent to the arbiter 403 which based on the data policy determines which of the actions are be executed, such as Allowing and Logging; Allowing, Logging and Alerting; Dropping, Logging, and Alerting; Rejecting and Logging; or combinations of above actions etc. For example, a policy rule could be configured such that as the action for data flow going through sub-system 4 of system X is drop, the communication flow will be discarded into drop bin 404. Therefore, no data flow will be sent to network 405. However, as will be appreciated, the policy can be customized to prioritize any action over another or in any combination in accord with a policy rule configured to be executed by the arbiter.

For example, and without limitation, parallel option multiple action priorities may be enabled to prioritize an Action Decision on:

Designated Occurrence

For example if six systems along with their associated sub-systems are being used, if any of them generates a Block or Drop event, and the designated occurrence is set to One, then the communication will be dropped or rejected as specified.

Another example is as in above six systems along with their associated sub-systems are being used, if two systems or sub-systems generate a Block event, and the Designated Occurrence is set to Two, then the communication will be dropped or rejected as specified. If the designated occurrence is set to three or more, then the communication is allowed.

Consensus

As in above if six systems along with their associated sub-systems are being used and a consensus of 51% is required, meaning that more than half of the systems must generate a block event for the communication to be dropped or rejected.

For example if seven systems along with their associated sub-systems are being used totaling twenty-one event generating sub-systems and a consensus is set to 51%, then eleven or more of the systems have to produce block events to effectuate a Block event.

Combination

A combination of the two systems defined above may be used with some systems operating with Designated Occurrences and others with Consensus based Action Decision.

For example if six systems along with their associated sub-systems are being used and four of the systems are using a Consensus where a 51% consensus is required to generate an allow event and where two of the systems are Designated Occurrence where one occurrence is required to Block. If a consensus of better than 51% is reached, yet one of the Designated Occurrences generates a Block event, then the communication will be blocked. If a consensus of better than 51% is reached, and no Block events are generated by the Designated Occurrences, then the communication will be allowed.

Figure 5:
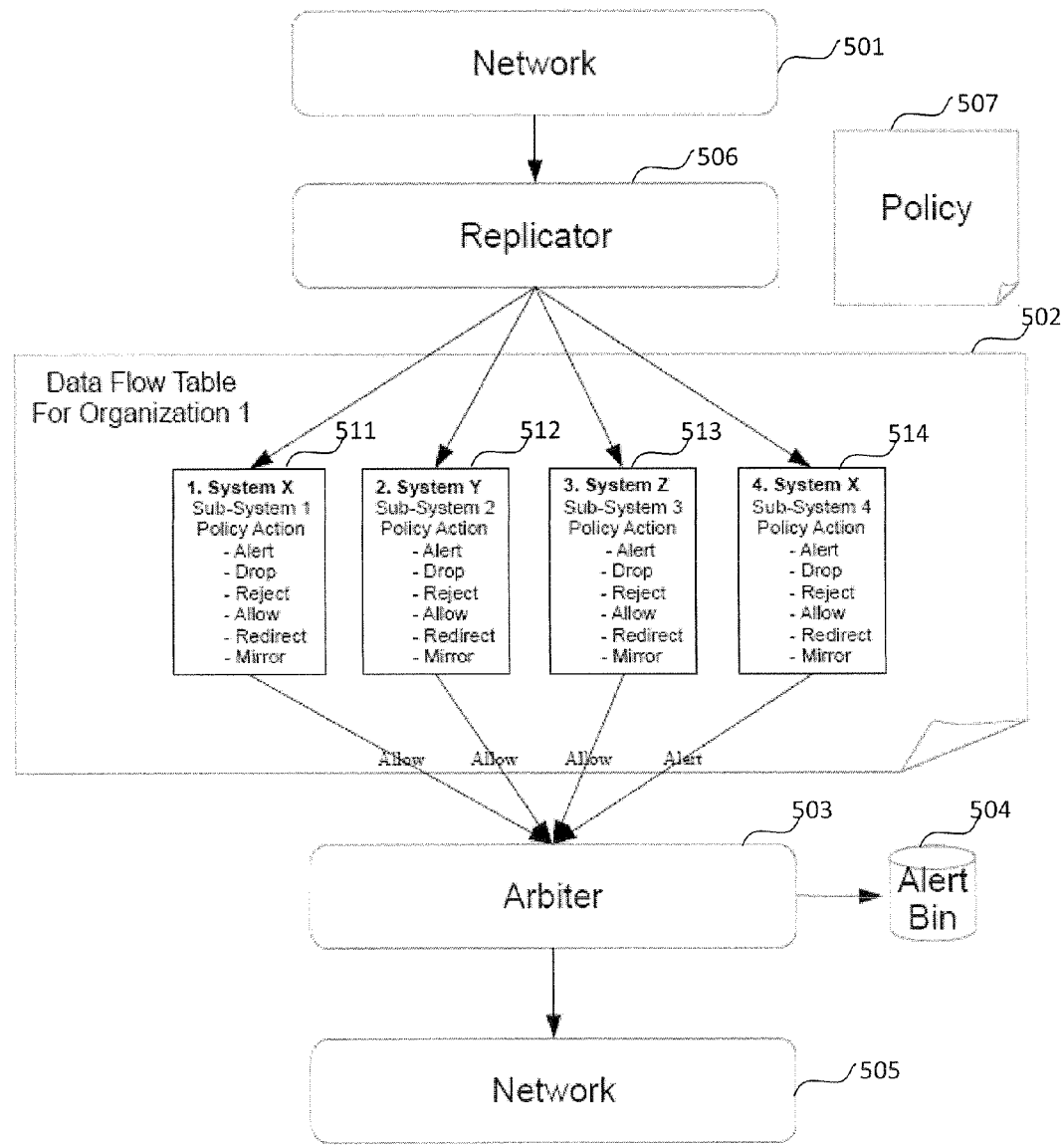
FIG. 5 illustrates a system for processing data flows in parallel according to an embodiment of the present disclosure.

According to an embodiment, FIG. 5 illustrates a system in which data flows may be processed in parallel to simultaneously or substantially simultaneously perform multiple functions at one or more P/PoP sites including allowing the flow. As shown in FIG. 5, the communication flow is transmitted via network 501 to the data flow table 502 in accord with a policy 507 for organization 1 where a replicator 506 simultaneously sends the flow to multiple systems/sub-systems 511-514, which are sub-systems 1 of system X, sub-systems 2 of system Y, sub-systems 3 of system Z and sub-systems 4 of system X, respectively. In these systems/sub-systems one or more of functions take place that may result in one or more actions that may include alert, drop, reject, allow, redirect, mirror, and/or next system/sub-system, etc. As shown in FIG. 5, the actions for data flows go through multiple systems/sub-systems 511-513 is allow, and the action for data flow goes through multiple systems/sub-systems 514 is alert. Then these actions from each of the systems/sub-systems 511-514 are sent to the arbiter 503 which based on policy determines the actions to be taken, such as Allowing and Logging; Allowing, Logging and Alerting; Dropping, Logging, and Alerting; Rejecting and Logging; or combinations of above actions etc. Since the action for data flow goes through sub-system 4 of system X is alert, the communication flow will be sent to alert bin 504. And because there is no drop action for the data flows, the communication flow will be transmitted by network 505.

Figure 6A:
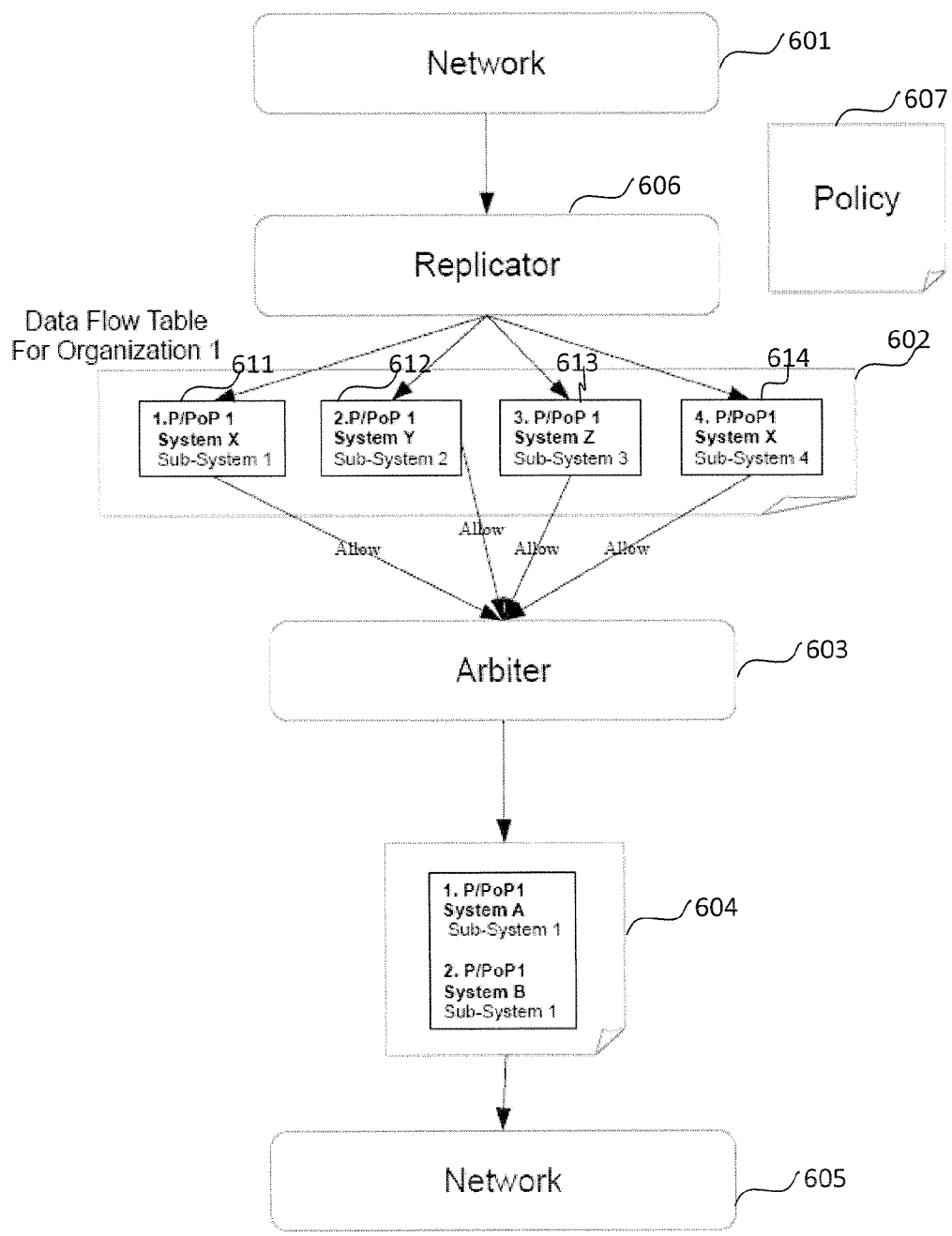
FIG. 6A illustrates a system in which a combination of Serial and Parallel communication flows are leveraged for data flow processing according to an embodiment of the present disclosure.
Figure 6B:
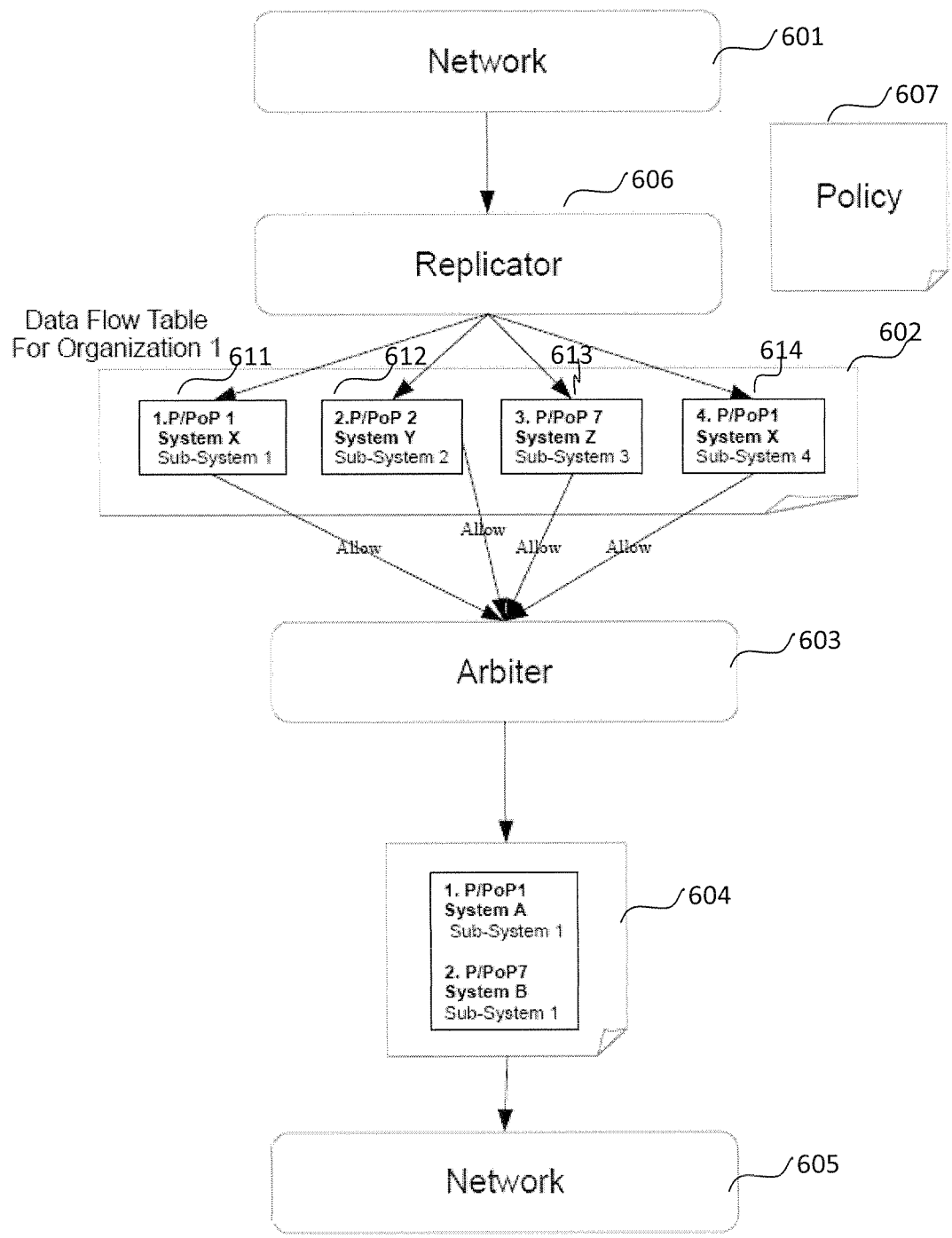
FIG. 6B illustrates a system in which a combination of Serial and Parallel communication flows are leveraged for data flow processing according to an embodiment of the present disclosure.

According to an embodiment, FIG. 6A illustrates a system in which a combination of Serial and Parallel communication flows are leveraged for data flow processing. As shown in FIG. 6A the communication flow is transmitted via network 601 to organization 1. The data flow table 602 in accord with a policy 607 for organization 1 shows that in organization 1, the flow is sent to the replicator 606 which in turn copies the data flow for parallel data processing by multiple systems/sub-systems 611-614, which are sub-systems 1 of system X, sub-systems 2 of system Y, sub-systems 3 of system Z and sub-systems 4 of system X, respectively. In these systems/sub-systems one or more of functions take place that may result in one or more actions that may include alert, drop, reject, allow, redirect, mirror, and/or next system/sub-system, etc. Then these actions are sent to the arbiter 603 which based on policy determines the actions to be taken. Since all of the actions for data flow goes through sub-system 611-614 are allow, the communication flow will be transmitted to data flow table 604, which shows that the data flow is sent in series through sub-system 1 of system A and sub-systems 1 of system B, where one or more of various actions are taken that may include alert, drop, reject, allow, redirect, mirror, and/or next system/sub-system, etc. And then according to the action taken in the data flow table 604, the communication flow is processed and passed on to network 605 for in or outbound delivery to the computer platforms, computing nodes, or other destination end-points.

As shown in FIG. 6A, each of the system and subsystem components are executed in the same P/PoP 1. However, as described herein the system and sub-system components may be distributed on multiple P/PoPs. For example, in FIG. 6B, the data flow table 602 for organization 1 shows that sub-systems 1 and 4 of system X are executed in P/PoP 1, sub-system 2 of system Y is executed in P/PoP 2, and sub-system 3 of system Z is executed in P/PoP 7. Similarly, the data flow table 604 shows that sub-system 1 of system A is executed in P/PoP 1, and sub-system 1 of system B is executed in P/PoP 7. Another example is shown in FIG. 6C, the data flow table 604 shows that sub-system 1 of system A is executed in P/PoP 1, and sub-system 1 of system B is executed in P/PoP 7.

Similarly, the data flow table 602 for organization 1 shows that sub-systems 1 and 4 of system X are executed in P/PoP 1, sub-system 2 of system Y is executed in P/PoP 2, and sub-system 3 of system Z is executed in P/PoP 7. Therefore, the serial and/or parallel data flow function may be executed across multiple P/PoPs.

As will be appreciated, FIGS. 3-6 show exemplary non-limiting examples of possible flow order selected by users, however flow orders can be either serial, parallel, parallel-to-serial, serial-to-parallel, parallel-to-serial-to-parallel, serial-to-parallel-to-serial, or any other combination as described herein.

According to an embodiment, virtual instances may also function within a single P/PoP or span one for multiple P/PoPs, or example distributed across geographic sites. Data flows within each virtual instance of a P/PoP can add, eliminate or modify flow table system/subsystem functions based on determinations made by previous systems/sub-systems. Moreover, specific data flows within virtual instances of one or more P/PoP may also be tagged for adherence to specific local, regional, national or industry specific compliances whereas specific behavioral and or data handling functions are instituted to ensure compliance. Examples of such compliances may include, without limitation, personally identifiable information (PII), payment card industry (PCI), health insurance portability and accountability act (HIPAA), Bundesdatenschutzgesetz (BDSG) German Federal data protection act and other global acts. These flows within virtual instances may be kept locally within the boundaries defined by the governance, encrypted while in transit or any associated data is stored in encrypted format, and/or disable all local logging, and/or sanitize some or all elements of the data or logs among myriad actions that may be implemented to remain compliant.

Figure 7A:
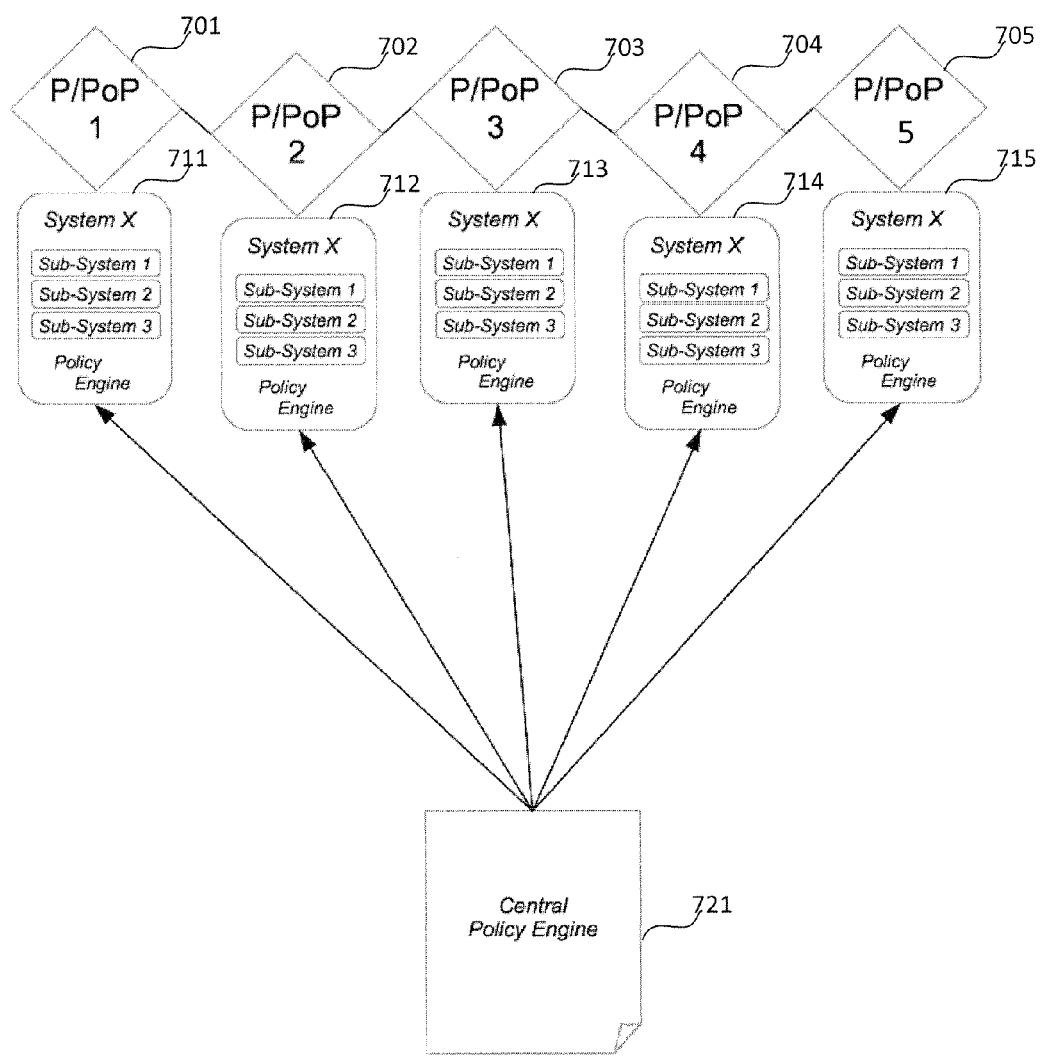
FIG. 7A illustrates a system in which a policy is distributed to multiple P/PoPs to support multiple points of ingress and egress via a single policy according to an embodiment of the present disclosure.

According to an embodiment, FIG. 7 illustrates a system in which a singular policy is distributed to multiple P/PoPs to support multiple points of ingress and egress via a single policy set. As shown in FIG. 7, centralized policy engine 721 allows policies to be defined for each virtual instance, system, and sub-system, for example, systems 711-715. These policies, which comprise, for example, Trigger(s), Function(s), Action(s) and Event Record sections, are then distributed to P/PoPs 701-705 where they are applied to each applicable virtual instance, system, and sub-system. Once the policies are applied, the virtual instance, system, and sub-systems within each P/PoP will behave accordingly to support or not support the processing of flows.

A policy may utilize one or a plurality P/PoPs depending on organizational requirements including for the purposes of redundancy, geographically distributed communications, application acceleration or other purposes.

Figure 7B:
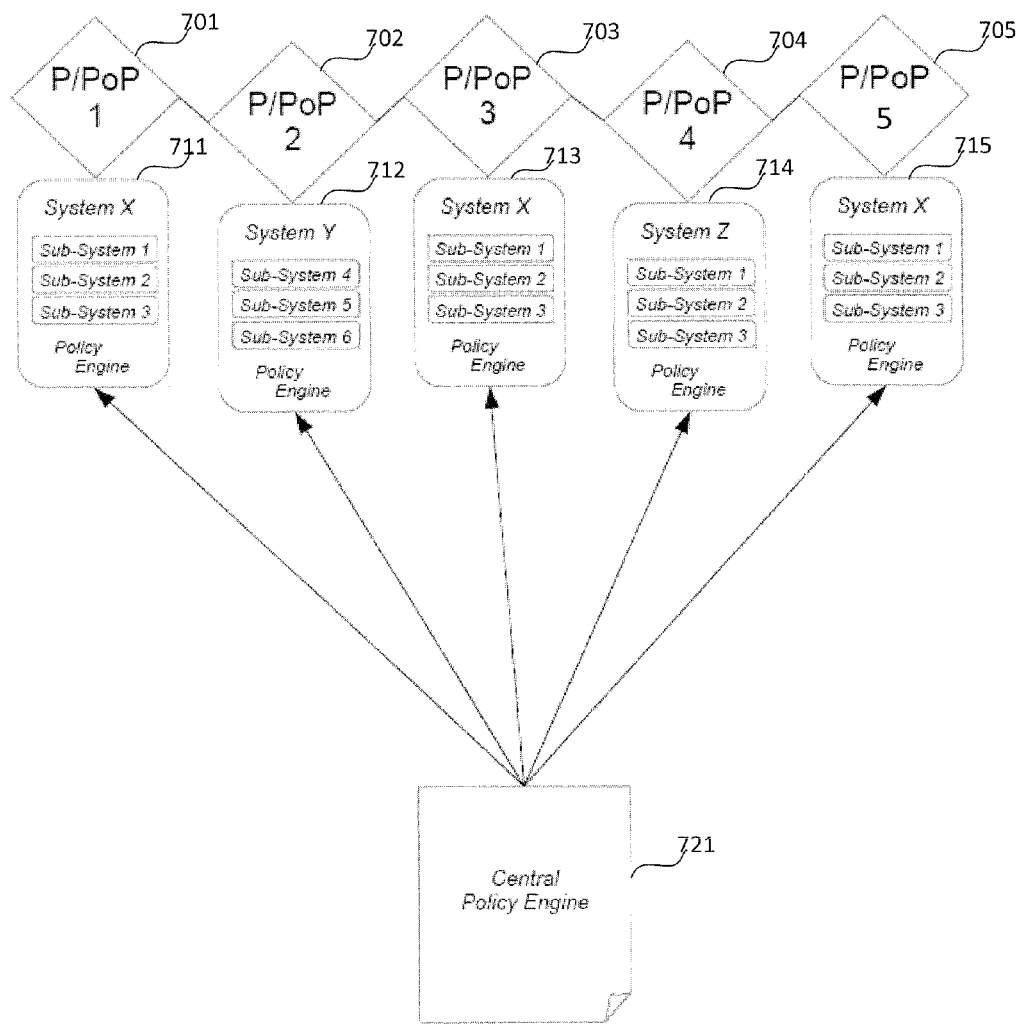
FIG. 7B illustrates a system in which a policy is distributed to multiple P/PoPs to support multiple points of ingress and egress via a single policy according to an embodiment of the present disclosure.

A single policy maybe comprised of a uniform (consistent) policy for all distributed P/PoPs or a policy may utilize different functionality or different policy elements at disparate P/PoPs to support disparate source or destination nodes with varying policy requirements. Different policies or policy elements for a single policy may be applied at multiple P/PoPs. Thus Trigger(s), Function(s), Action(s) and Event Record sections for a single policy can be distributed across multiple PoP, such that, for example, a Function can be executed by one P/PoP and the Action for that Function can be executed by one or more other P/PoP. As shown in FIG. 7B, centralized policy engine 721 may define different policies for each virtual instance, system, and sub-system, for example, systems X, Y and Z. For example, users for the same organizations may be offered varying Internet access policies. For example in one country or region users may use P/PoP 1 and have access to and communicate through a retailer's web site for shopping for products such as intimate apparel or a product free from copyright restrictions, while in another country users may use P/PoP 7, and the same class of user may not be allowed access to the retailer's site or elements thereof, due to its culture or based on policies imposed by its government.

Figure 8:
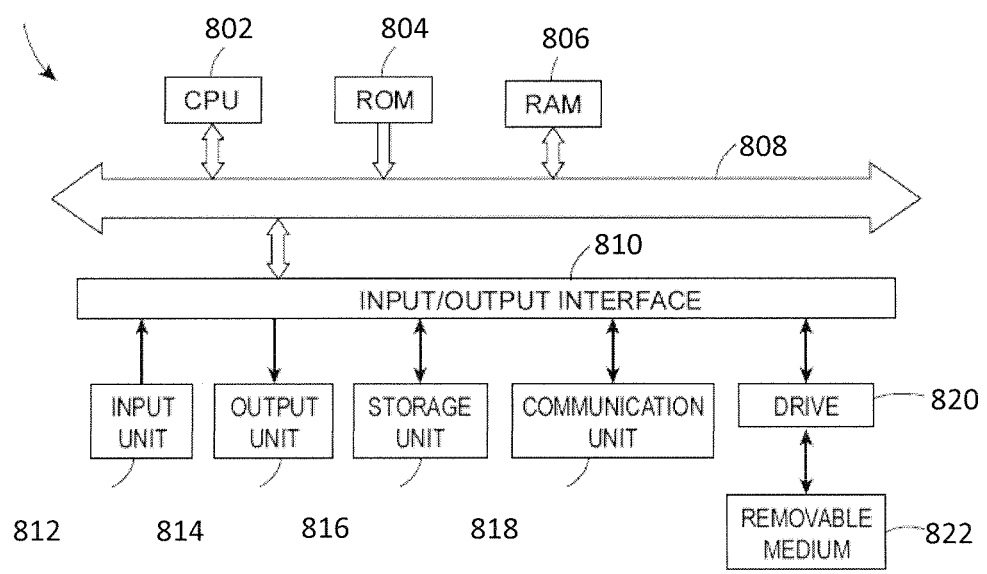
FIG. 8 illustrates an exemplary structure of a server, system, or a terminal according to an embodiment.

FIG. 8 illustrates an exemplary structure of a server, system, or a terminal according to an embodiment.

The exemplary server, system, or terminal 800 includes a CPU 802, a ROM 804, a RAM 806, a bus 808, an input/output interface 810, an input unit 812, an output unit 814, a storage unit 816, a communication unit 818, and a drive 820. the CPU 802, the ROM 804, and the RAM 806 are interconnected to one another via the bus 808, and the input/output interface 810 is also connected to the bus 808. In addition to the bus 808, the input unit 812, the output unit 814, the storage unit 816, the communication unit 818, and the drive 820 are connected to the input/output interface 810.

the CPU 802, such as an Intel Core™ or Xeon™ series microprocessor or a Freescale™ PowerPC™ microprocessor, executes various kinds of processing in accordance with a program stored in the ROM 804 or in accordance with a program loaded into the RAM 806 from the storage unit 816 via the input/output interface 810 and the bus 808. the ROM 804 has stored therein a program to be executed by the CPU 802. the RAM 806 stores as appropriate a program to be executed by the CPU 802, and data necessary for the CPU 802 to execute various kinds of processing.

A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 812 includes a keyboard, a mouse, a microphone, a touch screen, and the like. When the input unit 812 is operated by the user, the input unit 812 supplies an input signal based on the operation to the CPU 802 via the input/output interface 810 and the bus 808. the output unit 814 includes a display, such as an LCD, or a touch screen or a speaker, and the like. the storage unit 816 includes a hard disk, a flash memory, and the like, and stores a program executed by the CPU 802, data transmitted to the terminal 800 via a network, and the like.

A removable medium 822 formed of a magnetic disk, an optical disc, a magneto-optical disc, flash or EEPROM, SDSC (standard-capacity) card (SD card), or a semiconductor memory is loaded as appropriate into the drive 820. the drive 820 reads data recorded on the removable medium 822 or records predetermined data on the removable medium 822.

One skilled in the art will recognize that, although the data storage unit 816, ROM 804, RAM 806 are depicted as different units, they can be parts of the same unit or units, and that the functions of one can be shared in whole or in part by the other, e.g., as RAM disks, virtual memory, etc. It will also be appreciated that any particular computer may have multiple components of a given type, e.g., CPU 802, Input unit 812, communications unit 818, etc.

An operating system such as Microsoft Windows 7®, Windows XP® or Vista™, Linux®, Mac OS®, or Unix® may be used by the terminal. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable memory such as a magneto-optical disk or SD card and others within a read-only computer chip. Some or all of the instructions and data may be stored in a location physically remote from, yet still accessible by, the processor. Similarly, the processor may actually comprise a collection of processors which may or may not operate in parallel. As will be recognized by those skilled in the relevant art, the terms "system," "terminal," and "server" are used herein to describe a computer's function in a particular context. A terminal may, for example, be a computer that one or more users work with directly, e.g., through a keyboard and monitor directly coupled to the computer system. Terminals may also include a smart phone device, a personal digital assistant (PDA), thin client, or any electronic device that is able to connect to the network and has some software and computing capabilities such that it can interact with the system. A computer system or terminal that requests a service through a network is often referred to as a client, and a computer system or terminal that provides a service is often referred to as a server. A server may provide contents, content sharing, social networking, storage, search, or data mining services to another computer system or terminal. However, any particular computing device may be indistinguishable in its hardware, configuration, operating system, and/or other software from a client, server, or both. The terms "client" and "server" may describe programs and running processes instead of or in addition to their application to computer systems described above. Generally, a (software) client may consume information and/or computational services provided by a (software) server or transmitted between a plurality of processing devices.

As used in this application, the terms "component" or "system" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Systems and methods described herein may by implemented by software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

A network environment as described herein can comprise any combination of linked computers, or processing devices, adapted to transfer and process data. Non-limiting exemplary network environments are described in U.S. patent application Ser. No. 13/828,296 entitled SYSTEM AND METHOD FOR CONTROLLING, OBFUSCATING AND ANONYMIZING DATA AND SERVICES WHEN USING PROVIDER SERVICES and U.S. patent application Ser. No. 13/827,940 entitled NETWORK SYSTEM AND METHOD FOR IMPROVING ROUTING CAPABILITY the entirety of each of which are incorporated by reference hereby. The network may be private Internet Protocol (IP) networks, as well as public computer networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. A cellular network such as Global System for Mobile Communication (GSM) and Enhanced Data rates for GSM Evolution (EDGE) or LTE Advanced is another example of a wireless network. Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers. Yet, other examples of a wireless network may include a 3 G communication network or a 4 G communication network. Yet another example of a wireless network is Near field communication, or NFC, which are a set of short-range wireless technologies. NFC, which typically acts a distance of 4 cm or less and operates at 13.56 MHz and at rates ranging from 106 kbit/s to 848 kbit/s. NFC involves: an initiator that generates an RF field, which in turn powers a passive target. The NFC target can take a very simple form factors such as tags, stickers, key fobs, or cards that do not require batteries, but can also be used in conjunction with smart cards or phones incorporating NFC functionality.

According to an embodiment, each of the servers and terminals may be, for example, a server computer operatively connected to network, via bi-directional communication channel, or interconnector, respectively, which may be for example a serial bus such as IEEE 1394, or other wire or wireless transmission medium. The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between the remote modules or devices.

The servers and terminals are adapted to transmit data to, and receive data from, each other via the network. The servers and terminals typically utilize a network service provider, such as an Internet Service Provider (ISP) or Application Service Provider (ASP) (ISP and ASP are not shown) to access resources of the network.

It will be appreciated by those ordinarily skilled in the art that the foregoing brief description and the following detailed description are exemplary (i.e., illustrative) and explanatory of the subject matter as set forth in the present disclosure, but are not intended to be restrictive thereof or limiting of the advantages that can be achieved by the present disclosure in various implementations. Additionally, it is understood that the foregoing summary and ensuing detailed description are representative of some embodiments as set forth in the present disclosure, and are neither representative nor inclusive of all subject matter and embodiments within the scope as set forth in the present disclosure. Thus, the accompanying drawings, referred to herein and constituting a part hereof, illustrate embodiments of this disclosure, and, together with the detailed description, serve to explain principles of embodiments as set forth in the present disclosure.

The invention claimed is:

1. A network system comprising:
   one or more Perimeter Points of Presence (P/PoP) configured to provide a virtual perimeter, the one or more Perimeter Points of Presence (P/PoP) comprising:
   a network interface component configured to accept physical or virtual connections or both;
   a plurality of selectable service area systems for processing data, each service area system comprising one or more selectable service area sub-systems, wherein the selectable service area systems and selectable service area sub-systems can be configured to provide a customized virtual perimeter for an entity,
   wherein when a plurality of entities use the virtual perimeter, the one or more Perimeter Points of Presence (P/PoP) are configured to allow each entity to select its own service area systems and sub-systems, and
   wherein the one or more Perimeter Points of Presence (P/PoP) are configured to
   receive data via a connection to the Perimeter Points of Presence (P/PoP);
   process the data using at least one of the service area systems and selected service area sub-systems configured as a data processing policy for the entity; and
   transmit the processed data as policy compliant data from the one or more Perimeter Points of Presence (P/PoP) to a destination connected to the Perimeter Points of Presence (P/PoP), and
   wherein the one or more Perimeter Points of Presence (P/PoP) are configured to process the received data in parallel, serially, or both.

2. The system of claim 1, wherein each service area is configured to perform at least one of a plurality of actions with respect to the received data.

3. The system of claim 1 wherein the system is configured to perform the parallel processing by at least:
   replicating the received data across a plurality of the service area systems in parallel;
   determining at least one of a plurality of actions to be performed on the received data at each of the plurality service areas simultaneously or substantially simultaneously; and
   sending the determinations to an arbiter component configured to perform one or more of the actions on the received data determined by each service area based on the data processing policy for the entity.

4. The system of claim 1, wherein the system is configured to:
   process the received data through plurality service area systems in series; and
   perform at least one of a plurality of actions on the received data at each of the plurality service area systems.

5. The system of claim 1, wherein the system is configured to process the same received data in both parallel and in series.

6. The system of claim 1, wherein the received data is communicated from an unknown source, the unknown source being an entity beyond the organizational control of an entity associated with the customized virtual perimeter.

7. The system of claim 6, wherein the received data from the unknown source is transmitted by the one or more P/PoP as policy compliant data to one or more known or unknown destinations or both.

8. The system of claim 1, wherein the received data is communicated from a known source, the known source being an entity within the organizational control of the entity associated with the customized virtual perimeter.

9. The system of claim 8, wherein the received data from the known source is communicated through the one or more P/PoP as policy compliant data to one or more known or unknown destinations or both.

10. The system of claim 1, wherein the one or more P/PoP is configured to leverage a physical connection comprising a dedicated physical connection to connect to the one or more P/PoPs to facilitate communications through the one or more P/PoP to other destinations.

11. The system of claim 1, wherein the one or more P/PoP is configured to leverage a virtual connection comprising a long-term or temporary virtual connection over private networks, public networks, or both to connect to the one or more P/PoP to facilitate communications through the one or more P/PoP to other destinations.

12. The system of claim 1, wherein the P/PoP is configured to simultaneously leverage both physical and virtual connections, the configuration comprising at least one of:
   the physical and virtual connections as components of a single connection, and
   to connect to the one or more P/PoP to facilitate communications through the one or more P/PoP to other destinations.

13. The system of claim 1, wherein the entity associated with the virtual perimeter comprises one or more known entities having organizational control over one or more computing nodes comprising: a computer platform, a data center, a public cloud instance, a private cloud instance, a hybrid cloud instance, an application-as-a-service platform (AaaS), a software-as-a-service platform (SaaS), a mobile device, a remote user, and an access end-point,
    wherein the one or more known entities are within the organizational control of the entity associated with the customized virtual perimeter.

14. The system of claim 1, wherein the selectable service area systems includes one or more service area systems selected from a plurality of service area systems comprising the group of: network service area system, security service area system, application resiliency and availability service area system, and an application acceleration service area system.

15. The system of claim 14, wherein the security service area system comprises a plurality of selectable sub-service area systems, the selectable sub-services area systems comprising: a network port and protocol stateful control, application layer control, deep packet inspection, threat management, malware protection, user and device identification and validation, content filtering, encryption, decryption, and re-encryption.

16. The system of claim 14, wherein the application resiliency and availability service area system comprises a plurality of selectable sub-service area systems, the selectable sub service area systems selected from the group of availability monitoring, system port monitoring, system application function and availability monitoring, communication distribution between multiple systems, application redirection in the event of unavailability of a critical aspect needed to facilitate the availability of one or more applications.

17. The system of claim 1, wherein a single policy for an entity associated with a virtual perimeter is distributed to the one or more Perimeter Points of Presence (P/PoP) to support multiple points of ingress and egress via the single policy.

18. A method implemented by at least once computer comprising a processor, memory, and a computer readable medium storing computer code thereon, wherein the computer is configured to perform at least:
    accepting network connections at one or more Perimeter Points of Presence (P/PoP) from plurality of entities including at least one entity associated with a customized virtual perimeter;
    receiving a data flow from a data source at the one or more Perimeter Points of Presence (P/PoP);
    processing the received data flow at the one or more Perimeter Points of Presence (P/PoP) using a data processing policy for the entity associated with the customized virtual perimeter for the entity;
    processing the received data in parallel, serially, or both; and
    transmitting the processed data flow as policy compliant data flow from the one or more Perimeter Points of Presence (P/PoP) to an end point,
    wherein the customized virtual perimeter comprises selectable service area systems for creating the policy, and
    wherein the one or more Perimeter Points of Presence (P/PoP) allow each entity to customize contents of its own data processing policy.

19. The method of claim 18 wherein the parallel processing method comprises:
    replicating the received data across a plurality of the service area systems in parallel;
    determining at least one of a plurality of actions to be performed on the received data at each of the plurality service area systems simultaneously; and
    sending the determinations to an arbiter configured to perform one or more of the actions determined by each service area system based on the data processing policy for the entity associated with the customized virtual perimeter.

20. The method of claim 18, further comprising:
    processing the received data through plurality service area systems in series; and
    performing at least one of a plurality of actions at each of a plurality service area systems.

21. The method of claim 18, wherein the system is configured to process the same inbound received data in both parallel and in series.

* * * * *